United States Patent
Han

(10) Patent No.: US 10,190,513 B2
(45) Date of Patent: Jan. 29, 2019

(54) CONTROL METHOD OF ENGINE SYSTEM

(71) Applicant: HYUNDAI MOTOR COMPANY, Seoul (KR)

(72) Inventor: Kyoungchan Han, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 77 days.

(21) Appl. No.: 15/253,089

(22) Filed: Aug. 31, 2016

(65) Prior Publication Data
US 2017/0306865 A1 Oct. 26, 2017

(30) Foreign Application Priority Data
Apr. 26, 2016 (KR) .......................... 10-2016-0050752

(51) Int. Cl.
| | |
|---|---|
| *F02D 41/00* | (2006.01) |
| *F02M 26/08* | (2016.01) |
| *F02B 29/04* | (2006.01) |
| *F02B 37/007* | (2006.01) |
| *F02D 17/02* | (2006.01) |

(Continued)

(52) U.S. Cl.
CPC .......... *F02D 41/0007* (2013.01); *F02B 29/04* (2013.01); *F02B 37/002* (2013.01); *F02B 37/007* (2013.01); *F02D 17/02* (2013.01); *F02D 41/0077* (2013.01); *F02D 41/0087* (2013.01); *F02D 41/26* (2013.01); *F02D 43/04* (2013.01); *F02M 26/08* (2016.02); *F02M 26/43* (2016.02); *Y02T 10/144* (2013.01); *Y02T 10/146* (2013.01)

(58) Field of Classification Search
CPC .. F02D 41/0007; F02D 41/0087; F02D 17/02; F02D 41/26; F02D 43/04; F02D 41/0077; F02B 37/002; F02B 37/007; F02B 29/04; F02M 26/43; F02M 26/08; Y02T 10/146; Y02T 10/144

USPC ........................................................ 60/605.2
See application file for complete search history.

(56) References Cited

U.S. PATENT DOCUMENTS

| | | | | |
|---|---|---|---|---|
| 6,715,289 B2 * | 4/2004 | Mader | ................... | F02B 37/007 123/198 F |
| 2015/0240705 A1 * | 8/2015 | Wu | ........................ | F02B 37/007 60/601 |

FOREIGN PATENT DOCUMENTS

| | | | | |
|---|---|---|---|---|
| DE | 102016203823 B3 * | 8/2017 | ......... | F02D 41/0007 |
| EP | 3168447 A1 * | 5/2017 | ......... | F02D 41/0082 |

(Continued)

*Primary Examiner* — Jason Newton
(74) *Attorney, Agent, or Firm* — McDermott Will & Emery LLP

(57) ABSTRACT

An engine system includes an intake passage, a non-deactivation exhaust passage, a second exhaust manifold, a first turbocharger including a first turbine rotated by exhaust gas flowing via the first exhaust manifold, a second turbocharger including a second turbine rotated by exhaust gas flowing via the second exhaust manifold, an exhaust outlet, a main intake circulation passage in communication with the intake passage via a compressor of the first turbocharger such that supercharging air is supplied to the intake passage, a sub intake circulation passage in communication with the main intake circulation passage via a compressor of the second turbocharger such that supercharging air is supplied to the main intake circulation passage, and a deactivation valve disposed on the sub intake circulation passage between the compressor of the second turbocharger and the main intake circulation passage so as to selectively open/close the sub intake circulation passage.

9 Claims, 2 Drawing Sheets

(51) Int. Cl.
*F02D 41/26* (2006.01)
*F02D 43/04* (2006.01)
*F02B 37/00* (2006.01)
*F02M 26/43* (2016.01)

(56) References Cited

FOREIGN PATENT DOCUMENTS

JP 2005-291019 A 10/2005
JP 2011-231683 A 11/2011

* cited by examiner

CONTROL METHOD OF ENGINE SYSTEM

CROSS-REFERENCE TO RELATED APPLICATION

This application claims the benefit of priority to Korean Patent Application No. 10-2016-0050752, filed with the Korean Intellectual Property Office on Apr. 26, 2016, the entire contents of which are incorporated herein by reference.

TECHNICAL FIELD

The present disclosure relates to an engine system and control method thereof. More particularly, the present disclosure relates to an engine system and a control method thereof in which supercharging efficiency and thermal efficiency are improved.

BACKGROUND

In general, an internal combustion engine is an apparatus that operates using energy from heat and pressure generated by burning a gas mixture in a combustion chamber. As an internal combustion engine, a multi-cylinder engine with a plurality of cylinders for increasing power and reducing noise and vibration is generally used.

A diesel engine of the internal combustion engine generally has an efficiency of about 40% in comparison with a gasoline engine, which results from a higher compression ratio of the diesel engine. In addition, devices such as a turbocharger supplying pressurized air to a cylinder and an intercooler cooling an intake air of an engine having a high temperature may be additionally provided to a diesel engine such that an output lower than an output of a gasoline engine in a conventional diesel engine is improved to become equal to or higher than an output of a gasoline engine.

Meanwhile, research for decreasing fuel consumption, and simultaneously increasing an output torque in middle and low speed sections of an engine having a turbocharger has been developed, and research for efficiently controlling to supply a recirculation exhaust gas has been developed.

As one technology according to the research, a cylinder deactivation apparatus of an engine that improves fuel efficiency by deactivating some of a plurality of cylinders in an engine when the engine is driven in middle and low speed sections has been developed For instance, for a four-cylinder engine, the apparatus may not inject and ignite a gas mixture in two cylinders and may operate the engine with only the other two cylinders.

However, as a capacity of a turbine of a turbocharger is excessive when some of a plurality of cylinders are deactivated, supercharging or turbocharging, efficiency may be decreased, a supply of recirculation exhaust gas may be deteriorated, and thermal efficiency may be decreased.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an engine system and control method thereof having advantages of ensuring supercharging efficiency and smooth supply of exhaust gas even while some cylinders are deactivated.

An engine system according to an exemplary embodiment of the present disclosure may be an engine system having a plurality of cylinder comprising at least one deactivation cylinder which is selectively deactivated and at least one non-deactivation cylinder which is always not deactivated.

An engine system having a plurality of cylinders comprising at least one deactivation cylinder which is selectively deactivated and at least one non-deactivation cylinder which is never deactivated may include an intake passage for inhaling exterior air so as to transfer exterior air to an intake manifold such that air is respectively supplied to the plurality of cylinders; a non-deactivation exhaust passage for receiving exhaust gas from the non-deactivation cylinder; a first exhaust manifold for receiving exhaust gas from the non-deactivation exhaust passage; a deactivation exhaust passage for receiving exhaust gas from the deactivation cylinder; a second exhaust manifold for receiving exhaust gas from the deactivation exhaust passage; a first turbocharger including a first turbine rotated by exhaust gas flowing via the first exhaust manifold; a second turbocharger including a second turbine rotated by exhaust gas flowing via the second exhaust manifold; an exhaust outlet for discharging exhaust gas flowing via the first and second turbines of the first and second turbochargers to outside; a main intake circulation passage in communication with the intake passage via a compressor of the first turbocharger such that supercharging air is supplied to the intake passage; a sub intake circulation passage in communication with the main intake circulation passage via a compressor of the second turbocharger such that supercharging air is supplied to the main intake circulation passage; and a deactivation valve disposed on the sub intake circulation passage between the compressor of the second turbocharger and the main intake circulation passage so as to selectively open/close the sub intake circulation passage.

A controller may control an operation of the deactivation valve.

The deactivation valve may be operated to close the sub intake circulation passage when the deactivation cylinder is deactivated.

A recirculation exhaust gas passage may communicate one of the non-deactivation exhaust passage and the first exhaust manifold with the intake passage so as to recirculate exhaust gas of the non-deactivation cylinder.

A recirculation valve may selectively open/close the recirculation exhaust gas passage and a controller for controlling an operation of the recirculation valve.

An intercooler may cool supercharging air having a high temperature caused by compressors of the first and second turbochargers.

An engine system control method for controlling an engine system having at least one non-deactivation cylinder being never deactivated, at least one deactivation cylinder which is selectively deactivated, a first exhaust manifold in communication with the non-deactivation cylinder, a second exhaust manifold in communication with the deactivation cylinder, a first turbocharger including a first turbine rotated by exhaust gas flowing via the first exhaust manifold, a second turbocharger including a second turbine rotated by exhaust gas flowing via the second exhaust manifold, a main intake circulation passage transferring intake air via a compressor of the first turbocharger, and a sub intake circulation passage transferring intake air via a compressor of the second turbocharger may include determining whether a CDA condition for deactivating the deactivation cylinder is satisfied if an engine is started; determining whether to perform a deactivation of the deactivation cylinder; blocking intake of the deactivation cylinder to realize deactivation of the deactivation cylinder; cutting fuel injection of the deactivation cylinder to realize deactivation of the deactivation cylinder; and closing the sub intake circulation passage when the deactivation cylinder is deactivated.

The steps of blocking the intake, cutting the fuel injection and closing the sub intake circulation passage may be simultaneously performed.

The method may include performing and maintaining a CDA mode if the steps of locking the intake, cutting the fuel injection and closing the sub intake circulation passage are performed and maintained.

Intake air may be supplied to the deactivation cylinder if the CDA condition is not satisfied or if it is determined to not perform deactivation of the deactivation cylinder.

Fuel may be injected to the deactivation cylinder if the CDA condition is not satisfied or if it is determined to not perform deactivation of the deactivation cylinder.

The sub intake circulation passage is opened if the CDA condition is not satisfied or if it is determined to not perform deactivation of the deactivation cylinder.

The method may include performing and maintaining a general mode where intake air is normally supplied to the deactivation cylinder, fuel is normally injected to the deactivation cylinder, and the sub intake circulation passage is opened if the CDA condition is not satisfied or if it is determined to not perform deactivation of the deactivation cylinder.

The method may further include determining whether starting of the engine is to be OFF and the method is ended if the engine starting is to be OFF.

The method may be returned to the step of determining whether the CDA condition is satisfied if the engine starting is not to be OFF.

DETAILED DESCRIPTION

An exemplary embodiment of the present disclosure will hereinafter be described in detail with reference to the accompanying drawings.

Figure 1:
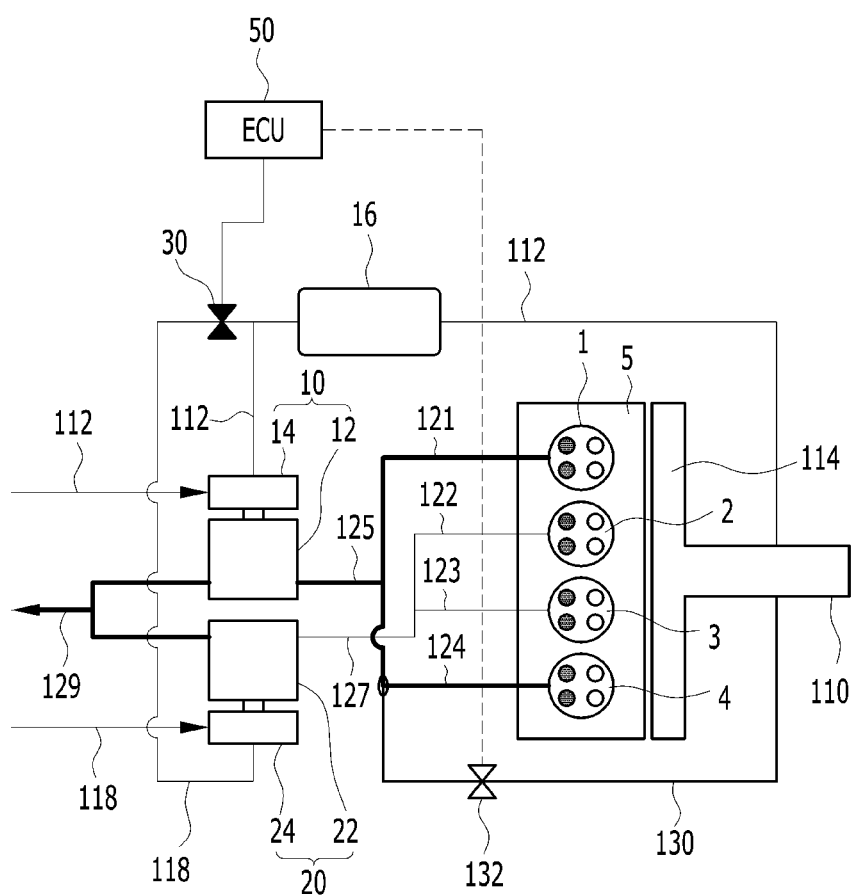
FIG. 1 is a schematic diagram of an engine system according to an exemplary embodiment of the present disclosure.

FIG. 1 is a schematic diagram of an engine system according to an exemplary embodiment of the present disclosure.

As shown in FIG. 1, an engine system according to an exemplary embodiment of the present disclosure may include an intake passage 110, an intake manifold 114, an engine 5, a first cylinder 1, a second cylinder 2, a third cylinder 3, a fourth cylinder 4, a first exhaust passage 121, a second exhaust passage 122, a third exhaust passage 123, a fourth exhaust passage 124, a first exhaust manifold 125, a second exhaust manifold 127, a first turbocharger 10, a second turbocharger 20, an exhaust outlet 129, a main intake circulation passage 112, an intercooler 16, a recirculation exhaust gas passage 130, a recirculation valve 132, a sub intake circulation passage 118, a deactivation valve 30 and a controller 50.

The intake passage 110 may be a passage which inhales exterior air by opening a general throttle valve (not shown).

The intake manifold 114 may be formed to supply air inhaled through the intake passage 110 to respective cylinders 1, 2, 3 and 4 of the engine 5.

The engine 5 may have four cylinders comprising a first cylinder 1, a second cylinder 2, a third cylinder 3 and a fourth cylinder 4. An exemplary embodiment of the present disclosure represents an engine 5 and has first, second, third fourth cylinders 1, 2, 3 and 4, but a number of cylinders which are included in the multi-cylinder engine 5 is not limited thereto. Herein, numerals of the first, second, third, and fourth cylinders (1, 2, 3 and 4) may mean a sequence that they are arranged from a front of the engine 5.

The first exhaust passage 121 may be in communication with the first cylinder 1 so as to receive exhaust gas of the first cylinder 1.

The second exhaust passage 122 may be in communication with the second cylinder 2 so as to receive exhaust gas of the second cylinder 2.

The third exhaust passage 123 may be in communication with the third cylinder 3 so as to receive exhaust gas of the third cylinder 3.

The fourth exhaust passage 124 may be in communication with the fourth cylinder 4 so as to receive exhaust gas of the fourth cylinder 4.

The first exhaust manifold 125 may collect exhaust gas of cylinders 1 and 4 which are never deactivated and then discharge exhaust gas, and the second exhaust manifold 127 may collect exhaust gas of cylinders 2 and 3 which are selectively deactivated and then discharge exhaust gas. At this time, the first and fourth cylinders 1 and 4 are non-deactivation cylinders which are never deactivated, and the second and third cylinders 2 and 3 are deactivation cylinders which are selectively deactivated. In addition, cylinder deactivation (CDA) of the second and third cylinder 2 and 3 may be selectively realized depending on the operational states of the engine 5. Meanwhile, the second exhaust passage 122 and the third exhaust passage 123, which may be respectively in communication with the second cylinder 2 and the third cylinder 3, will be called "deactivation exhaust passage 122 and 123", and the first exhaust passage 121 and the fourth exhaust passage 124, which may be in communication with the first cylinder 1 and the fourth cylinder 4, will be called "non-deactivation exhaust passage 121 and 124".

Herein, it is well known to a person of an ordinary skill in the art that cylinder deactivation is realized by stopping ignition, cutting fuel injection, blocking intake, and so on, so a detailed description thereof will be omitted.

The first turbocharger 10 and the second turbocharger 20 include turbines 12 and 22 which rotate by using energy of exhaust gas, and perform the function of a general turbocharger that a compressor 14 and 24, which are directly connected with the turbine 12 and 22, or with the first turbine 12 and second turbine 22, pushes supercharging, or turbocharged or pressurized, air into the cylinders 1, 2, 3, and 4 so as to improve an output of the engine 5. Meanwhile, the first turbocharger 10 and the second turbocharger 20 may be turbochargers which have the same capacity. Further, the first and second turbocharger 10 and 20 may have a capacity and volume which is smaller than a capacity and a volume of a turbocharger in a conventional engine in which the turbocharger is provided.

Exhaust gas flowing via the first exhaust manifold 125 may be supplied to rotate the turbine 12 of the first turbocharger 10, and exhaust gas flowing via the second exhaust manifold 127 may be supplied to rotate the turbine 22 of the second turbocharger 20.

The exhaust outlet 129 may consolidate exhaust gas flowing via the turbine 12 of the first turbocharger 10 and the turbine 22 of the second turbocharger 20 and then discharge exhaust gas to the outside.

The main intake circulation passage 112 may be in communication with the intake passage 110 via the compressor 14 of the first turbocharger 10. In addition, exterior air flowing into the main intake circulation passage 112 is supercharging air having a high temperature by passing via the compressor 14.

Meanwhile, as exhaust gas is flowing via the first exhaust manifold 125, which may be in communication with the first and fourth cylinders 1 and 4, always rotates the turbine 12 of the first turbocharger 10 regardless of deactivation of the second and third cylinders 2 and 3, the compressor 14 of the first turbocharger 10 is always operated. Thus, supercharging efficiency of air flowing via the compressor 14 of the first turbocharger 10 through the main intake circulation passage 112 can be ensured even while the second and third cylinders 2 and 3 are deactivated.

The intercooler 16 may be a device, which is disposed on the main intake circulation passage 112 for cooling supercharging air having a high temperature as a result of the compressor 14. That is, exterior air flowing into the main intake circulation passage 112 may be sequentially passed through the compressor 14 and the intercooler 16 so as to be supplied to the intake passage 110.

One end of the recirculation exhaust gas passage 130 may be in communication with one of the first exhaust passage 1, fourth exhaust passage 4, and the first exhaust manifold 125, through which exhaust gas of the first and fourth cylinders 1 and 4 may be passed, so as to recirculate a part of exhaust gas of the first and fourth cylinders 1 and 4. As illustrated in FIG. 1, the recirculation exhaust gas passage 130 may be in communication with the fourth exhaust passage 4, but it is not limited thereto. When the recirculation exhaust gas passage 130 is opened, a part of exhaust gas flowing via the communicated first exhaust passage 1, fourth exhaust passage 4 and first exhaust manifold 125 flows into the recirculation exhaust gas passage 130. In addition, the other end of the recirculation exhaust gas passage 130 may be in communication with the intake passage 110 such that a portion of exhaust gas of the first and fourth cylinders 1 and 4 is supplied to the intake passage 110 so as to be recirculated.

The recirculation valve 132 is disposed on the recirculation exhaust gas passage 130. In addition, the recirculation valve 132 may selectively open/close the recirculation exhaust gas passage 130 such that a part of exhaust gas of the first and fourth cylinder 1 and 4 is selectively supplied to the intake passage 110 according to the state of the engine 5 and the driving condition of a vehicle.

The sub intake circulation passage 118 may be in communication with the main intake circulation passage 112 via the compressor 24 of the second turbocharger 20. In addition, exterior air flowing into the sub intake circulation passage 118 may be supercharging air having a high temperature due to passing through the compressor 24. At this time, the intercooler 16 may cool supercharging air having a high temperature which is supplied to the main intake circulation passage 112 after be heated and/or pressurized by the compressor 24 of the second turbocharger 20.

Meanwhile, as no exhaust gas flows via the second exhaust manifold 127 when the second and third cylinders 2 and 3 are deactivated, the turbine 22 of the second turbocharger 20 is not rotated. Thus, the compressor 24 of the second turbocharger 20 is not operated when the second and third cylinders 2 and 3 are deactivated.

The deactivation valve 30 may be disposed on the sub intake circulation passage 118 between the compressor 24 of the second turbocharger 20 and the main intake circulation passage 112. In addition, the deactivation valve 30 may be operated to close the sub intake circulation passage 118 when the second and third cylinders 2 and 3 are deactivated and open the sub intake circulation passage 118 when the second and third cylinders 2 and 3 are not deactivated. In other words, the deactivation valve 30 may be operated to selectively communicate the sub intake circulation passage 118 with the main intake circulation passage 112 according to selective deactivation of the second and third cylinders 2 and 3.

Therefore, supercharging air flowing via the compressor 14 of the first turbocharger 10 may be only supplied to the intake passage 110 during a deactivation mode of deactivating the second and third cylinders 2 and 3, and supercharging air flowing via the compressor 24 of the second turbocharger 20 may be supplied to the intake passage 110 together with supercharging being flowed via the compressor 14 of the first turbocharger 10 during a general mode of not deactivating the second and third cylinders 2 and 3.

The controller 50 may be connected with the recirculation valve 132 and the deactivation valve 30 so as to control the operations of the recirculation valve 132 and the deactivation valve 30. At this time, the recirculation valve 132 and the deactivation valve 30 may be electrically operated by a solenoid and so on, the controller 50 may be a general electronic control unit (ECU: electronic control unit) supervising various controls for electronic devices of a vehicle.

Figure 2:
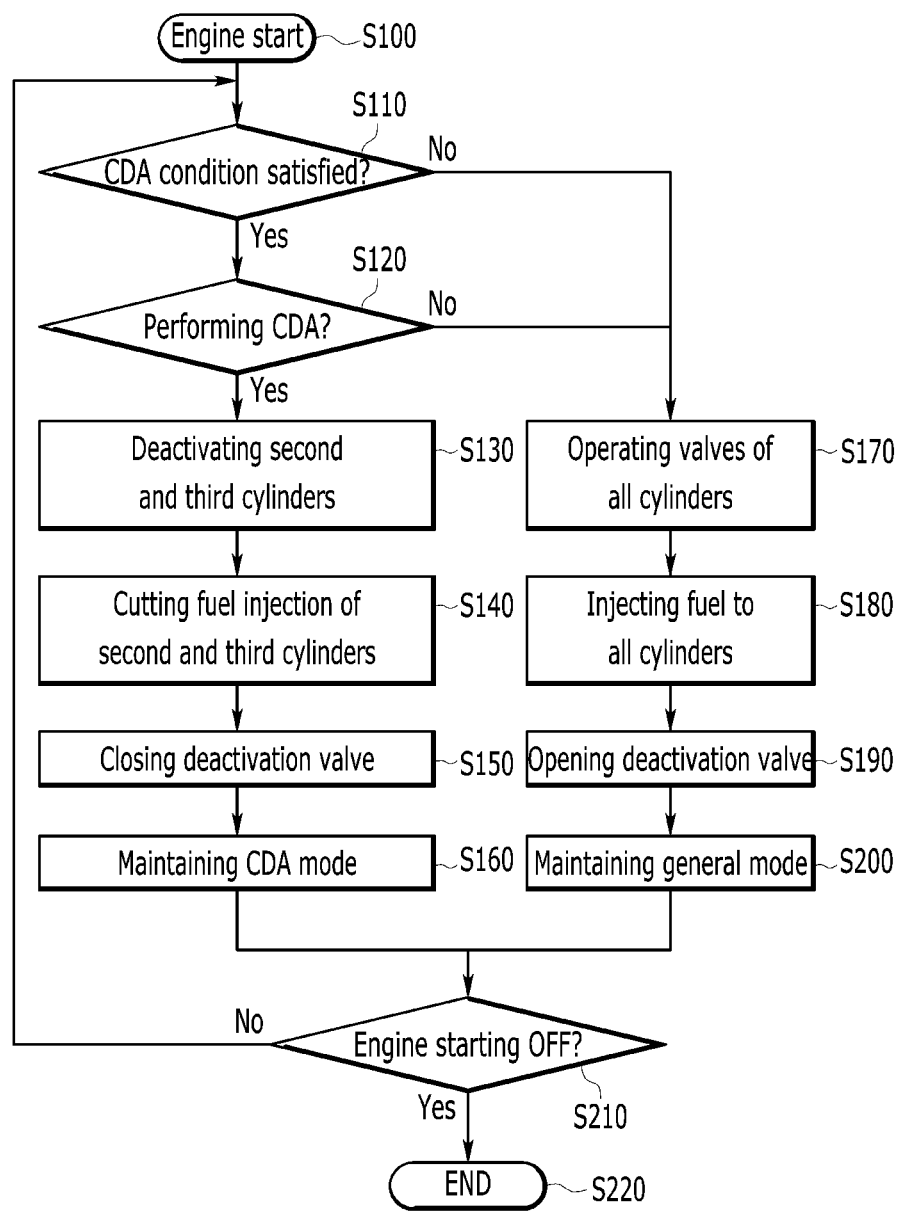
FIG. 2 is a flowchart of a method of controlling an engine system according to an exemplary embodiment of the present disclosure.

FIG. 2 is a flowchart of a method of controlling an engine system according to an exemplary embodiment of the present disclosure.

As shown in FIG. 2, if the engine 5 is started at a step S100, the controller 50 may determine whether conditions for cylinder deactivation (CDA condition) are satisfied at a step S110. Herein, the CDA condition for deactivating the second and third cylinders 2 and 3 may be predetermined according to the operational states of the engine 5 by a person of an ordinary skill in the art.

When the CDA condition is satisfied, the controller 50 may determine whether to perform deactivation of the second and third cylinders 2 and 3 at step S120. Herein, the step S120 of determining whether performing deactivation may be performed by receiving information about driving conditions of a vehicle.

When it is determined to perform deactivation of the second and third cylinders 2 and 3, intake of the second and third cylinders 2 and 3 may be blocked at a step S130. Herein, it is well known to a person of an ordinary skill in the art that blocking intake may be performed by deactivation of an intake valve (not shown). In addition, deactivation of the intake valve may be controlled by the controller 50.

When intake of the second and third cylinders 2 and 3 is blocked, fuel injection of the second, third cylinder 2 and 3 may be cut at a step S140. Herein, it is well known to a person of an ordinary skill in the art that cutting fuel injection may be performed by deactivation of an injector (not shown). In addition, deactivation of the injector may be controlled by the controller 50.

When fuel injection of the second and third cylinders 2 and 3 is cut, the controller 50 may control the deactivation valve 30 such that the sub intake circulation passage 118 is closed at a step S150.

At this time, the step S130 blocking the intake, the step S140 of cutting the fuel injection, and the step S150 of closing the deactivation valve 30 may be simultaneously performed or sequentially performed according to a design by a person of an ordinary skill in the art. In addition, if the step S130 blocking the intake, the step S140 of cutting the fuel injection, and the step S150 of closing the deactivation valve 30 are performed and maintained, the cylinder deactivation mode (CDA mode) of the engine 5 may be performed and maintained at a step S160.

If the CDA condition is not satisfied at the step S110 or it is determined to not perform deactivation of the second and third cylinders 2 and 3 at step S120, intake air may be supplied to the second and third cylinders 2 and 3 at a step S170. That is, the intake valves of all cylinders 1, 2, 3 and 4 may be normally operated so as to supply intake air.

When intake air is supplied to the second and third cylinders 2 and 3, fuel may be injected to the second and third cylinders 2 and 3 at a step S180. That is, the injectors of all cylinders 1, 2, 3 and 4 may be normally operated so as to inject fuel.

When fuel is injected to the second and third cylinders 2 and 3, the controller 50 may control the deactivation valve 30 such that the sub intake circulation passage 118 is opened at a step S190. In addition, if the step S170 of normally supplying intake air, the step S180 of normally injecting fuel, and the step S190 of opening the deactivation valve 30 are performed and maintained, a general mode of engine 5 is performed and maintained at a step S200 so that the cylinders 2 and 3 are not deactivated.

While the CDA mode of the engine 5 is performed and maintained at the step S160 or the general mode of the engine 5 is performed and maintained, the controller 50 may consistently determine whether starting of the engine 5 is to be OFF at a step S210.

If the engine 5 starting is not to be OFF, the step S110 may return.

Meanwhile, if the engine 5 starting is to be OFF, an engine system control method according to an exemplary embodiment of the present disclosure may be ended at a step S220.

According to an exemplary embodiment of the present disclosure, as supercharging efficiency and smooth supply of exhaust gas can be ensured even while some cylinders 2 and 3 are deactivated, an area of cylinder deactivation of the engine 5 may be expanded. In addition, a temperature of exhaust gas may be increased even while some cylinders 2 and 3 are deactivated, and post-processing efficiency of exhaust gas may be enhanced. Therefore, fuel consumption can be improved.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An engine system control method for controlling an engine system having at least one non-deactivation cylinder being never deactivated, at least one deactivation cylinder which is selectively deactivated, a first exhaust manifold in communication with the non-deactivation cylinder, a second exhaust manifold in communication with the at least one deactivation cylinder, a first turbocharger including a first turbine rotated by exhaust gas flowing via the first exhaust manifold, a second turbocharger including a second turbine rotated by exhaust gas flowing via the second exhaust manifold, a main intake circulation passage transferring intake air via a first compressor of the first turbocharger, and a sub intake circulation passage transferring intake air via a second compressor of the second turbocharger, comprising:
   determining engine operating conditions;
   determining whether a cylinder deactivation (CDA) condition for deactivating the at least one deactivation cylinder is satisfied upon engine start;
   determining whether to perform a deactivation of the at least one deactivation cylinder;
   blocking intake of the at least one deactivation cylinder to realize deactivation of the at least one deactivation cylinder;
   cutting fuel injection of the at least one deactivation cylinder to realize deactivation of the at least one deactivation cylinder; and
   closing the sub intake circulation passage when the at least one deactivation cylinder is deactivated,
   wherein the exhaust gas, which flows from the first exhaust manifold to continuously pass through the first turbine, and the exhaust gas, which flows from the second exhaust manifold to pass through the second turbine, are consolidated at an exhaust outlet after passing through the first and second turbines and discharged to outside, and wherein the first compressor, which is connected to the first turbine, continuously operates.

2. The method of claim 1, wherein the steps of blocking the intake, cutting the fuel injection and closing the sub intake circulation passage are simultaneously performed.

3. The method of claim 1, further comprising performing and maintaining a CDA mode when the steps of locking the intake, cutting the fuel injection and closing the sub intake circulation passage are performed and maintained.

4. The method of claim 1, wherein intake air is supplied to the at least one deactivation cylinder when the CDA condition is not satisfied or when it is determined to not perform deactivation of the at least one deactivation cylinder.

5. The method of claim 1, wherein fuel is injected to the at least one deactivation cylinder when the CDA condition is not satisfied or when it is determined to not perform deactivation of the at least one deactivation cylinder.

6. The method of claim 1, wherein the sub intake circulation passage is opened when the CDA condition is not satisfied or when it is determined to not perform deactivation of the at least one deactivation cylinder.

7. The method of claim 1, further comprising performing and maintaining a general mode where intake air is normally supplied to the at least one deactivation cylinder, fuel is normally injected to the at least one deactivation cylinder, and the sub intake circulation passage is opened when the CDA condition is not satisfied or when it is determined to not perform deactivation of the at least one deactivation cylinder.

8. The method of claim 1, further comprising determining whether the engine is operating and ending the method when the engine is not operating.

9. The method of claim 8, wherein the method is returned to the step of determining whether the CDA condition is satisfied when the engine is operating.

* * * * *